Figure 1:
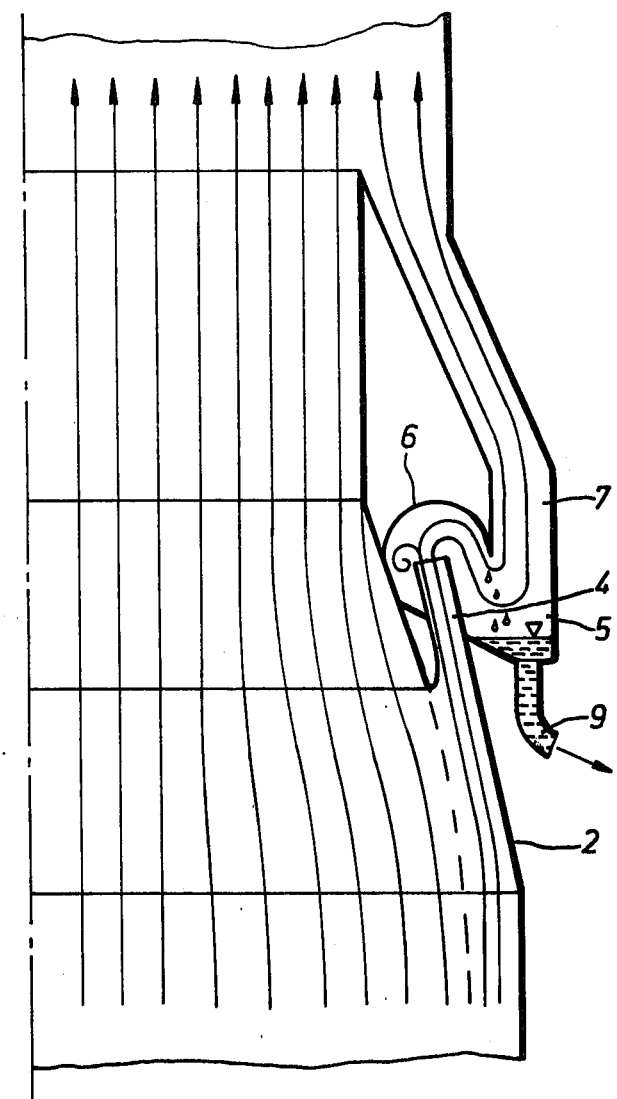

United States Patent [19]

Muschelknautz et al.

[11] 4,057,075
[45] Nov. 8, 1977

[54] SEPARATOR, ESPECIALLY FOR CHIMNEYS

[75] Inventors: Edgar Muschelknautz, Leverkusen; Armin Bürkholz; Hermann Wieschen, both of Cologne; Hans Guth, Berg.Neukirchen; Wolfgang Richter, Opladen, all of Germany

[73] Assignee: Bayer Aktiengesellschaft, Levekusen, Germany

[21] Appl. No.: 656,478

[22] Filed: Feb. 9, 1976

Related U.S. Application Data

[63] Continuation of Ser. No. 487,321, July 10, 1974, abandoned.

[30] Foreign Application Priority Data

Aug. 1, 1973   Germany ............................ 2338913

[51] Int. Cl.² ........................ B01D 45/00; 137 171;173
[52] U.S. Cl. ...................................... 137/171; 55/396
[58] Field of Search .......................................... 55/396

[56] References Cited

U.S. PATENT DOCUMENTS

| 719,517 | 6/1905 | Walker | 55/396 |
|---|---|---|---|
| 791,517 | 6/1905 | Walker | 55/396 |
| 1,553,477 | 9/1925 | Smith | 55/396 UX |
| 1,930,476 | 10/1973 | Hawley | 55/396 |
| 2,322,414 | 6/1943 | Bowen | 55/396 |
| 3,633,342 | 1/1972 | Richardson | 55/396 UX |

FOREIGN PATENT DOCUMENTS 488,746   7/1938   United Kingdom ................... 55/396

Primary Examiner—Alan Cohan
Attorney, Agent, or Firm—Burgess, Dinklage & Sprung

[57] ABSTRACT

This invention relates to an arrangement for separating for films, droplets and sprays from pipe-borne gas flows wherein a pipe is provided with a cross-sectional constriction adapted to accelerate the gas flow in the pipe and annular stripping slot having an annular baffle surface and communicating with a collecting trap, the annular baffle surface being adapted to receive the liquid-containing gas flow and to cause the flow to pass into the collecting trap.

9 Claims, 1 Drawing Figure

SEPARATOR, ESPECIALLY FOR CHIMNEYS

This is a continuation of application Ser. No. 487,321, filed July 10, 1974, now abandoned.

This invention relates to an arrangement for separating liquid films, droplets and sprays from pipe-borne flows, especially from chimneys.

It is known that liquid films and droplets can be separated from pipe-born flows, especially from chimneys, by means of stripping collars which are generally arranged coaxially just before or directly on the end of the chimney in such a way that an annular gap is left in between. In this case, however, the film accumulates on the vertical wall, is partly torn and thrown back into the gas stream causing the droplets to enter the atmosphere. Other arrangements are known which prevent liquids from condensing on the chimney wall by heating the chimney wall. Unfortunately, the increasing use of plastic chimneys is an obstacle to these solutions.

The object of the present invention is completely to separate liquid films, droplets and sprays from pipe-borne flows, especially from chimneys.

According to the invention, this object is achieved by virtue of the fact that an annular stripping slot is arranged in a pipe provided with a cross-sectional constriction, the annular stripping slot leading to an annular baffle surface which communicates with a separation chamber, at least one gas outlet and at least one liquid outlet being arranged in the separation chamber.

The advantages afforded by the arrangement according to the invention are in particular that it is possible completely to separate liquid films from pipe-borne flows, especially from chimneys. Furthermore, the arrangement according to the invention can be used for separating droplets and sprays providing the pipe-borne flow has a twist imparted to it before reaching the arrangement according to the invention. Known means can be used for this purpose, including for exmple, the provision of baffle plates or guide vanes or the tangential introduction of gas. On account of the long distance which they generally have to travel in chimneys, the droplets and spray are thrown against the wall of the pipe and are carried into the separator together with any condensate in the form of a liquid film or in the form of strands. In this way, the pipe-borne flow is freed from droplets, spray and liquid films. It is possible, especially in the case of exhaust-gas chimneys, to discharge the resulting purified gas into the atmosphere without any signs of spray, droplet or liquid elution in the area around the chimney. The particles which have not been separated are so fine that they have the properties of aerosols and are diluted as the gas spreads.

In another embodiment of the arrangement according to the invention, the ratio of cross-sectional constriction to free pipe diameter is within the range from 1:1.02 to 1.5 : 1 and preferably from 1 : 1.05 to 1.2 : 1. In this way, separation takes place at increased rates.

The choice of the position at which the cross-sectional constriction is arranged is governed by the design and geometry of the pipe, and enables liquid films to be safely separated, especially in cases where the separator according to the invention is subsequently built into chimneys.

In another embodiment of the arrangement according to the invention, the width of the stripping slot amounts to from 0.5 to 10% and preferably to from 1 to 2% of the free pipe diameter.

In this way, a sufficiently large volume of gas is passed through the stripping slot, with the result that the liquid film can be guided safely onto and separated on the baffle surface.

Reliable separation of the liquid film is obtained if, in accordance with another aspect of the invention, the annular baffle surface is in the form of a hollow throat having a radius of curvature from 1 to 10 times and preferably from 3 to 5 times the width of the stripping slot.

In another embodiment of the invention, a structurally particularly simple and functionally reliable form of the baffle surface is obtained by forming the baffle surface through that part of the stripping slot which projects into the separation chamber.

To ensure that the main flow in the pipe is disturbed as little as possible, the striping slot is defined in another embodiment of the arrangement according to the invention by a tongue the length of which is between 1 and 10 times the width of the stripping slot.

In another embodiment of the arrangement according to the invention, an annular channel leads from the separation chamber to the pipe above the stripping slot, the width of the annular channel amounting to between 1 and 3 times the width of the inlet slot, and the annular channel opens into the pipe in that section following the separator in the direction of flow.

The advantage of this arrangement way is, in particular, that the gas taken out of the main gas stream through the stripping slot is guided back into the main gas stream. By virtue of the fact that the annular channel acting as gas outlet which is one to three times wider than the inlet slot, the rate of flow of the gas is reduced. Free droplets moving inside the separation chamber cannot be entrained into the main gas stream through the slower rate of flow of the gas.

In a modification of the arrangement according to the invention, the annular channel is in the form of at least one tubular connection. This embodiment is of particular advantage in cases where the arrangement according to the invention for separating liquid films, droplets and dust from pipe-borne flows, especially from chimneys, is installed after installation of the chimney itself.

In another modification of the arrangement according to the invention, the gas outlet and the liquid outlet are combined. By virtue of this embodiment, it is possible with particular advantage by forced extraction to remove from the pipe, and especially from the chimney, only that quantity of gas which is required for separating the liquid film.

One embodiment of the arrangement according to the invention is described by way of example in the following with reference to the accompanying drawings, wherein:

The FIGURE is a cross-section through the arrangement according to the invention.

The pattern followed by the flow lines in the vicinity of the separator according to the invention is diagrammatically indicated in FIG. 1. The chimney constriction 2 accelerates the gas and the gas near the wall is forced to flow through the annular stripping slot 4 towards the baffle surface 6. Here the gas is sharply deflected and the entrained liquid is thrown on to the baffle surface 6 on account of its inertia. The liquid then flows from the baffle surface 6 to the bottom of the separation chamber 5 and is run off through the liquid outlet 9. The gas entering the gas outlet 7 is free from liquid and can be fed back into the main stream of chimney gas. By virtue of the fact that the gas is cleanly guided in the vicinity of the wall, the film of liquid on the chimney wall remains intact so that the liquid film does not give off any spray.

Another advantage of the arrangement according to the invention is that it can also subsequently be built into chimneys without any need for major, expensive reconstruction work.

What we claim is:

1. Apparatus for separating liquid films, droplets, and sprays contained in pipe borne gas flow of a chimney comprising: an upright pipe provided with a cross sectional construction adapted to accelerate the gas-liquid flow in the pipe, an annular stripping slot at the periphery of the pipe for receiving the accelerated gas-liquid flow and having an outlet end for the gas-liquid flow, an annular baffle surface for deflecting the gas-liquid flow issuing from the outlet end of the stripping slot, the annular baffle surface being above and spaced from said outlet end and being arched so that it is concave as viewed from said outlet end, an annular collecting trap having a liquid outlet and an annular gas outlet opening for receiving the deflected gas-liquid flow, an annular gas outlet channel extending upwardly from the annular gas outlet opening of the collecting trap and leading from the collecting trap to the pipe above the stripping slot for flow of the gas from the collecting trap upwardly and into the pipe, the liquid outlet of the collecting trap being disposed below tha annular baffle.

2. An arrangement as claimed in claim 1, wherein the ratio of cross-sectional constriction to free pipe diameter is from 1 : 1.02 to 1.5 : 1.

3. An arrangement as claimed in claim 2, wherein the ratio of cross-sectional constriction to free pipe diameter is from 1 : 1.05 to 1.2 : 1.

4. An arrangement as claimed in claim 1, wherein the width of the stripping slot is from 0.5 to 10% of the free pipe diameter.

5. An arrangement as claimed in claim 4, wherein the width of the stripping slot is from 1 to 2% of the free pipe diameter.

6. An arrangement as claimed in claim 1, wherein the annular baffle surface is in the form of a hollow throat with a radius of curvature that is one to ten times greater than the width of the stripping slot.

7. An arrangement as claimed in claim 1, wherein the annular baffle surface is in the form of a hollow throat with a radius of curvature that is three to six times greater than the width of the stripping slot.

8. An arrangement as claimed in claim 1, wherein the stripping slot is defined by a tongue which has a length between one and ten times greater than the width of the stripping slot.

9. An arrangement as claimed in claim 1, the width of the annular channel being one to three times greater than the width of the stripping slot.

* * * * *

UNITED STATES PATENT AND TRADEMARK OFFICE
CERTIFICATE OF CORRECTION

PATENT NO. : 4,057,075
DATED : November 8, 1977
INVENTOR(S) : Muschelknautz, et al It is certified that error appears in the above-identified patent and that said Letters Patent are hereby corrected as shown below:

| COLUMN | LINE | |
|---|---|---|
| Abstract | 5 | before "annular" first occurrence, insert --an--. |
| 1 | 39 | cancel "exmple" and substitute --example--. |
| 1 | 56-57 | cancel "1:1.02 to 1.5:1" and substitute --1:1.02 to 1.5--. cancel "1:1.05 to 1.2:1" and substitute --1:1.05 to 1.2--. |
| 2 | 17 | cancel "striping" and substitute --stripping-- |
| Claim 2 | 3 | cancel "1:1.02 to 1.5:1" and substitute --1:1.02 to 1.5--. |
| Claim 3 | 3 | cancel "1:1.05 to 1.2:1" and substitute --1:1.05 to 1.2--. |

Signed and Sealed this

Twelfth Day of September 1978

[SEAL]

Attest:

RUTH C. MASON
*Attesting Officer*

DONALD W. BANNER
*Commissioner of Patents and Trademarks*